(12) United States Patent
Harrington

(10) Patent No.: US 6,607,683 B1
(45) Date of Patent: Aug. 19, 2003

(54) METHODS AND APPARATUS FOR PRODUCING MANUFACTURED ARTICLES HAVING NATURAL CHARACTERISTICS

(76) Inventor: Bruce E. Harrington, 1995 E. Colton Rd., 45-103, Superior, CO (US) 80027

( * ) Notice: Subject to any disclaimer, the term of this patent is extended or adjusted under 35 U.S.C. 154(b) by 0 days.

(21) Appl. No.: 09/148,241

(22) Filed: Sep. 4, 1998

(51) Int. Cl.7 ................................................ B29C 33/40
(52) U.S. Cl. ....................... 264/227; 264/219; 264/220; 264/225; 264/226
(58) Field of Search .................... 264/227, 226, 264/225, 220, 219, 222; 249/55; 425/2

(56) References Cited

U.S. PATENT DOCUMENTS

| | | | | |
|---|---|---|---|---|
| 3,883,627 A | | 5/1975 | Fitts ............................ 264/51 |
| 4,385,088 A | * | 5/1983 | Baskin ......................... 428/15 |
| 4,735,754 A | * | 4/1988 | Buckner ..................... 264/40.1 |
| 4,752,229 A | * | 6/1988 | Clingerman et al. ........ 434/296 |
| 4,940,558 A | | 7/1990 | Jarboe et al. ............... 264/46.7 |
| 3,641,228 A | * | 10/1990 | Fleck ........................... 264/53 |
| 4,960,622 A | * | 10/1990 | Jarboe et al. .................. 428/15 |
| 5,250,250 A | * | 10/1993 | Gorski ........................ 264/227 |
| 5,372,869 A | | 12/1994 | Drexinger et al. ........... 428/174 |
| 5,380,478 A | * | 1/1995 | East ............................ 264/225 |
| 5,543,100 A | * | 8/1996 | Kluh et al. .................. 264/130 |
| 5,750,583 A | | 5/1998 | Gansen et al. ................ 521/78 |
| 5,911,927 A | * | 6/1999 | Roberts ..................... 264/46.4 |
| 6,042,766 A | * | 3/2000 | Bahr ......................... 264/46.4 |
| 6,139,786 A | * | 10/2000 | Corry ......................... 264/222 |

* cited by examiner

*Primary Examiner*—Suzanne E. McDowell
(74) *Attorney, Agent, or Firm*—Dorr, Carson, Sloan & Birney, P.C.

(57) ABSTRACT

A method is described comprising the steps of modifying a natural article to a predetermined configuration, making a mold of at least part of the modified natural article, filling the mold with a castable material to produce a reproduction of at least part of the surface of the modified natural article, modifying the reproduction to a predetermined configuration, making another mold from the modified reproduction and filling this mold with a castable material to produce another reproduction of at least part of the surface of the modified natural article; the second mold can be used to produce reproductions in commercial quantities.

14 Claims, 19 Drawing Sheets

METHODS AND APPARATUS FOR PRODUCING MANUFACTURED ARTICLES HAVING NATURAL CHARACTERISTICS

FIELD OF THE INVENTION

The invention of this application relates to the field of manufactured articles having the characteristics of natural articles. More particularly, this invention relates to methods and apparatus for producing a plastic article with some of the contours and colors of natural articles, and then employing a unique process to imbue the plastic article with corners, edges, and shapes not found in those natural articles, thereby creating a master part representing a state of the art previously unknown, and using this master part to manufacture plastic reproductions in commercial quantities.

DISCUSSION OF RELATED ART

Many people have attempted to manufacture plastic parts simulating the contours and colors of natural articles, but either produce an item that does not look authentic or that poorly reproduces the natural article in its entirety. One example is Formica®, a hard plastic substrate used to cover countertops and the like. Some forms of Formica® were impregnated during manufacture with dyes or other colored material to simulate the look of wood or stone. But the simulation was not convincing because the Formica® was flat. It did not have the texture of the natural articles it purported to simulate.

Another example is Corian®. This was made from plastic in the form of sheets of varying thickness for use as countertops and related structures. Most forms of Corian® were made by mixing filler materials with plastic. The resulting product was colored much like the filler material used during manufacture. Some forms of Corian® were made to resemble stone. But the simulation was not convincing because Coriane was largely flat. It did not have the texture of the natural articles it purported to simulate.

Yet another example is Linoleum®. This was made from various plastics and fillers, and was sold in the form of sheets or rolls, principally for covering floors with a wear-resistant surface. While some forms of Linoleums were colored and textured to resemble natural articles, the simulation was not convincing. The colors were artificial and the texture so regular as to dispel the notion of a natural articles.

Still another example is plastic floor tiles. These were typically squares of regular size. They were intended to be butted against one another once a mastic had been applied, and some were both colored and textured to resemble natural articles. However, the colors were often unconvincing. And the same was true for the textures, which were not only shallow, but also discontinuous where one tile butted up against another.

Another example is exterior siding designed to replace or cover some or all of the exterior of outdoor structures, including houses. This siding typically was made of plastic or aluminum and was marked or embossed in an effort to simulate natural articles. But the simulation was not convincing. The colors were unconvincing and the textures were not only shallow and unrealistic, but also discontinuous where one piece of siding butted up against another.

Another example is cultured stone. This was cast from cement and aggregate and simply mimicked the characteristics of real stone. It could not be molded any differently from the natural article, and required the same methods for installation as real stone.

Processes for casting plastics are disclosed in U.S. Pat. No. 5,750,583 to Gansen et al. and U.S. Pat. No. 3,883 627 to Fitts. Gansen et al. disclosed a process for the preparation of polyurethane products in which a plastic film was positioned in a mold, the mold was closed, a polyurethane reaction mixture was injected into the mold, and the product was removed from the mold once the reaction mixture had fully reacted.

Fitts disclosed a process in which a heat curable elastomeric sheet comprising a curing agent and either urethane elastomeric gum stock or silicone gum stock was placed over a master to be copied; the heat curable elastomeric sheet was one that did not cause inhibition between the master and the heat curable elastomeric sheet. Next, the elastomeric sheet was vacuum drawn against the master and the master sheet material was enclosed in a frame. Next, a foamed polymeric backing was formed in situ to force the heat curable elastomeric sheet against the master to copy the shape of the master in the heat curable elastomeric sheet, which was then cured in the shape of the master. Finally, articles were molded in the shape of the master in a mold constructed from the cured elastomeric sheet material.

A decorative plastic moulding was disclosed in U.S. Pat. No. 5,372,869 to Drexinger et. al. The moulding comprised two moulding pieces, each with a decorative face, a back, two sides and two ends. Each end of each piece had a 45 degree angle pre-mitered cut relative to the plane of the decorative face, with the pre-mitered cuts of each piece being in parallel planes. Each side of each piece was in a plane at a 45 degree angle to the plane of the decorative face, with the side planes converging at a position spaced from the back of the piece. The two moulding pieces were made of fire rated polyurethane.

Finally, a method for molding an artificial rock was disclosed in U.S. Pat. No. 4,940,558 to Jarboe et. al. This method entailed selecting a rock for reproduction, creating a flexible rubber mold and supporting cradle having a mold cavity conforming to the exterior of said rock, the mold having a substantial degree of flexibility and being created by applying an uncured liquid rubber forming material to said rock, curing the uncured liquid rubber forming material to produce the rubber mold, the cradle being formed by applying by spraying a low density urethane foam forming mixture to the exterior of the rubber mold to provide a self-supporting cradle, spraying a two-sided urethane composition into the mold cavity, said urethane composition comprising an isocyanate side and a polyol side and being mixed in a spray gun in a spray-in-mold process, carrying out the spraying to build up the molded artificial rock to a desired thickness and stripping the cradle and mold after curing.

SUMMARY OF THE INVENTION

Generally speaking, the invention of this application comprises methods and apparatus for producing manufactured articles or reproductions with characteristics of natural articles. These reproductions can replicate the contours and colors of all or part of a natural article and can be made in any shape or size. Steps in making these reproductions include the production of a mold of the natural article, with or without modification. This is followed by production of a master reproduction from the mold, typically by casting. The master reproduction is used to form another mold from which commercial quantities of commercial reproductions can be made. These reproductions represent a state of the art previously unknown.

One method of the invention for making reproductions that replicate the surface of a natural article comprises the steps of modifying a natural article to a predetermined configuration, making a mold of at least part of the modified natural article, and filling the mold with a castable material to produce a reproduction of at least part of the surface of the modified natural article. Next, the reproduction is modified to a predetermined configuration to make a master reproduction. Finally, another mold is made from the master reproduction and this mold is filled with a castable material to produce another reproduction of at least part of the surface of the modified natural article. This second mold can be used to produce reproductions in commercial quantities.

Another method of the invention for making reproductions that replicate the surface of a natural article comprises the steps of making a mold of at least part of the surface of a natural article and then lining the inner surface of a support structure with the mold so that the surface of the mold that replicates the surface of the natural article faces away from the inner surface of the support structure. Next, the support structure is filled with a castable material to produce a master reproduction of the lined inner surface of the support structure. Finally, the master reproduction is placed into a second support structure shaped to receive the master reproduction and a mold is made of the master reproduction. This mold can be used to produce reproductions in commercial quantities.

Apparatus of the invention includes a system for continuous production of cast reproductions that replicate the surface of a natural article. This system comprises a conveyor, one or more molds positioned on the conveyor, each of which replicates on at least part of its surface the surface of a natural article, a dispenser positioned adjacent to the conveyor for filling one or more of the molds with a castable material, and another conveyor positioned adjacent to the first conveyor for confining castable material to the molds. This system can further comprise one or more dispensers of paint, powdered coloring agents, or solvent positioned adjacent to the first conveyor, as well as a heater for heating the molds and drying any paint, coloring agent or solvent placed in the mold.

Yet another method of the invention for continuous production of cast reproductions that replicate the surface of a natural article comprises the steps of placing on a conveyor at least one mold that replicates on at least part of its surface the surface of the natural article, conveying the mold to a dispenser of castable material, filling the mold from the dispenser with castable material, and confining the castable material to the mold. The latter step can be accomplished by use of a second conveyor positioned adjacent to the first conveyor.

These methods and apparatus can be practiced or configured in a number of variations. Molds can be placed in rigid support structures to facilitate casting of manufacture reproductions in commercial quantities. The rigid support structure can be made of metal, wood or the like and lined with an inert material to prevent adhesion of castable material to the rigid support structure.

A reproduction can be colored by placing a powdered coloring agent or a paint (or both) into a mold before the mold is filled with castable material. In another variation, a powdered coloring agent is mixed into the castable material before the mold is filled with the castable material.

BRIEF DESCRIPTION OF THE DRAWINGS

FIG. 1 depicts four pieces of a natural article, in this case stone.

FIG. 2 depicts the stone pieces with grout strips added.

FIG. 3 depicts the stone pieces surrounded by a wooden dam.

FIG. 4 depicts the stone pieces after silicone has been poured over them.

FIG. 5 depicts the removal from the stone pieces of the silicone mold after it has cured.

FIG. 6 depicts the silicone mold from the top.

FIG. 7 depicts a polyurethane reproduction made from the silicone mold and subsequently modified to generate a master by removing material from two sides to produce an undercut.

FIG. 8 depicts a detail of the undercut of FIG. 7.

FIG. 9 depicts a detail of the fit between two polyurethane reproductions.

FIG. 10 depicts a second silicone mold made from the polyurethane reproduction.

FIG. 11 depicts the second silicone mold placed in a closable steel support mold.

FIG. 12 depicts a piece of stone onto which silicone has been poured.

FIG. 13 depicts the removal from the stone of the silicone sheet after it has cured.

FIG. 14 depicts a preshaped wooden mold lined with the silicone sheet.

FIG. 15 depicts a side view of the assembly of FIG. 14.

FIG. 16 depicts the assembly of FIG. 14 filled with polyurethane casting plastic.

FIG. 17 depicts a side view of the assembly of FIG. 16.

FIG. 18 depicts the removal of the cast polyurethane master reproduction from the assembly of FIG. 14.

FIG. 19 depicts a side view of the removal of the master reproduction from the assembly of FIG. 14

FIG. 20 depicts the master reproduction.

FIG. 21 is a side view of the master reproduction of FIG. 20 supported by a wooden board.

FIG. 22 depicts the master reproduction of FIG. 20 placed into a second wooden mold into which silicone rubber has been poured.

FIG. 23 depicts the resulting silicone rubber mold placed in a closable steel support mold for support during casting of polyurethane plastic reproductions.

FIG. 24 depicts the assembly of FIG. 23 filled with polyurethane casting plastic to produce a cast polyurethane reproduction.

FIG. 25 depicts a machine for the continuous production of polyurethane reproductions.

DESCRIPTION OF PREFERRED EMBODIMENTS

Figure 1:
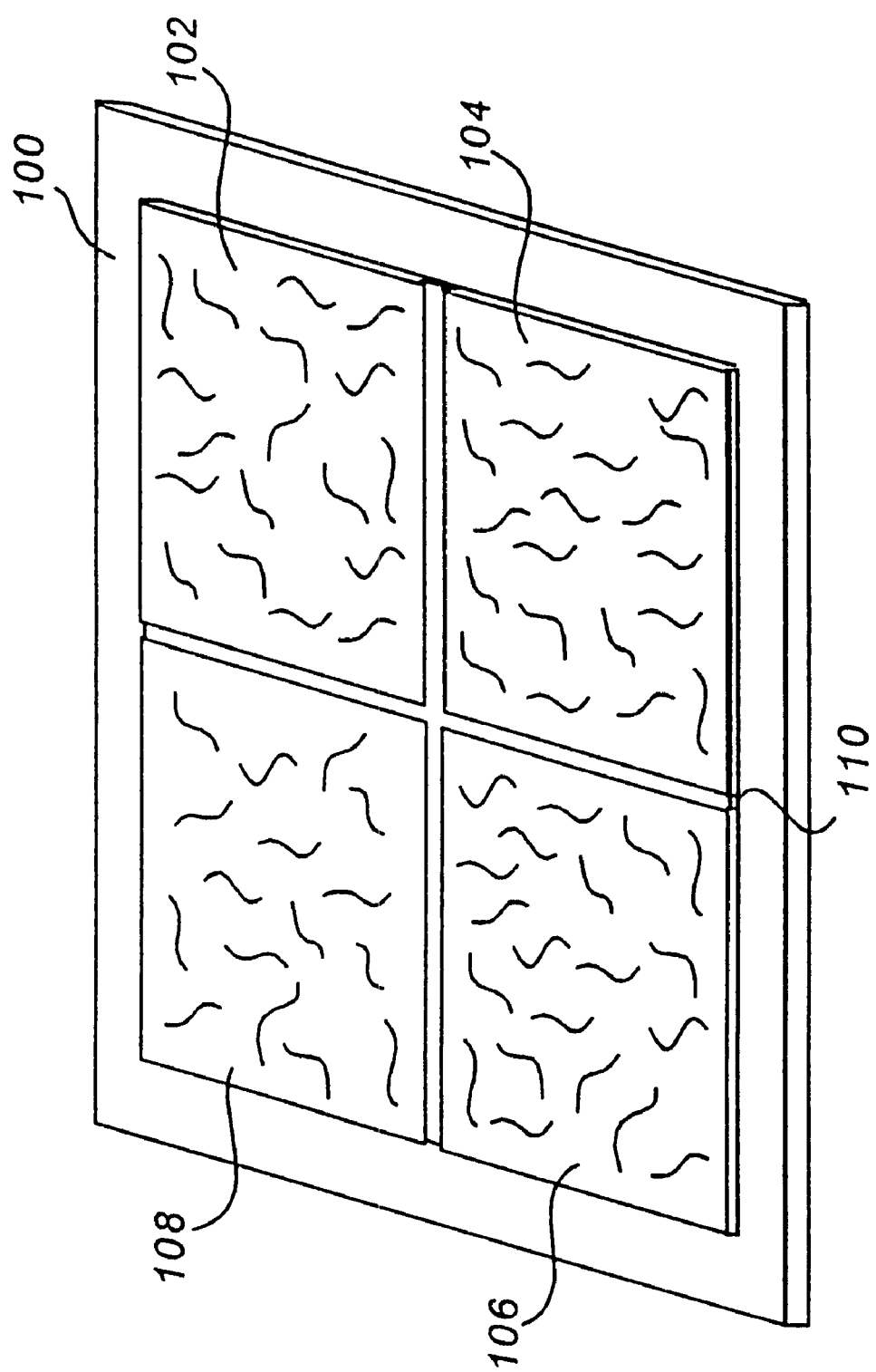
FIGS. 1 through 11 below relate to one embodiment of the invention of this application.

While the invention is susceptible to various modifications and alternative forms, specific embodiments are shown by way of example in the drawings and are described in detail below. The description and drawings are not intended to limit the invention to the particular embodiments disclosed. On the contrary, the invention embraces all modifications, equivalents, and alternatives falling within the spirit and scope of the invention as defined by the appended claims.

FIGS. 1 through 11 depict one preferred embodiment of the invention of this application. The process described is for making flat panel reproductions for use vertically in structures. These replicate panels replicate the surface of natural stone in a form that would be difficult or impossible to make with natural stone.

In FIG. 1, flagstones 102, 104, 106 and 108 are supported by wooden board 100. Grout has been placed in the spaces between flagstones 102, 104, 106 and 108 to produce filler 110.

Figure 2:
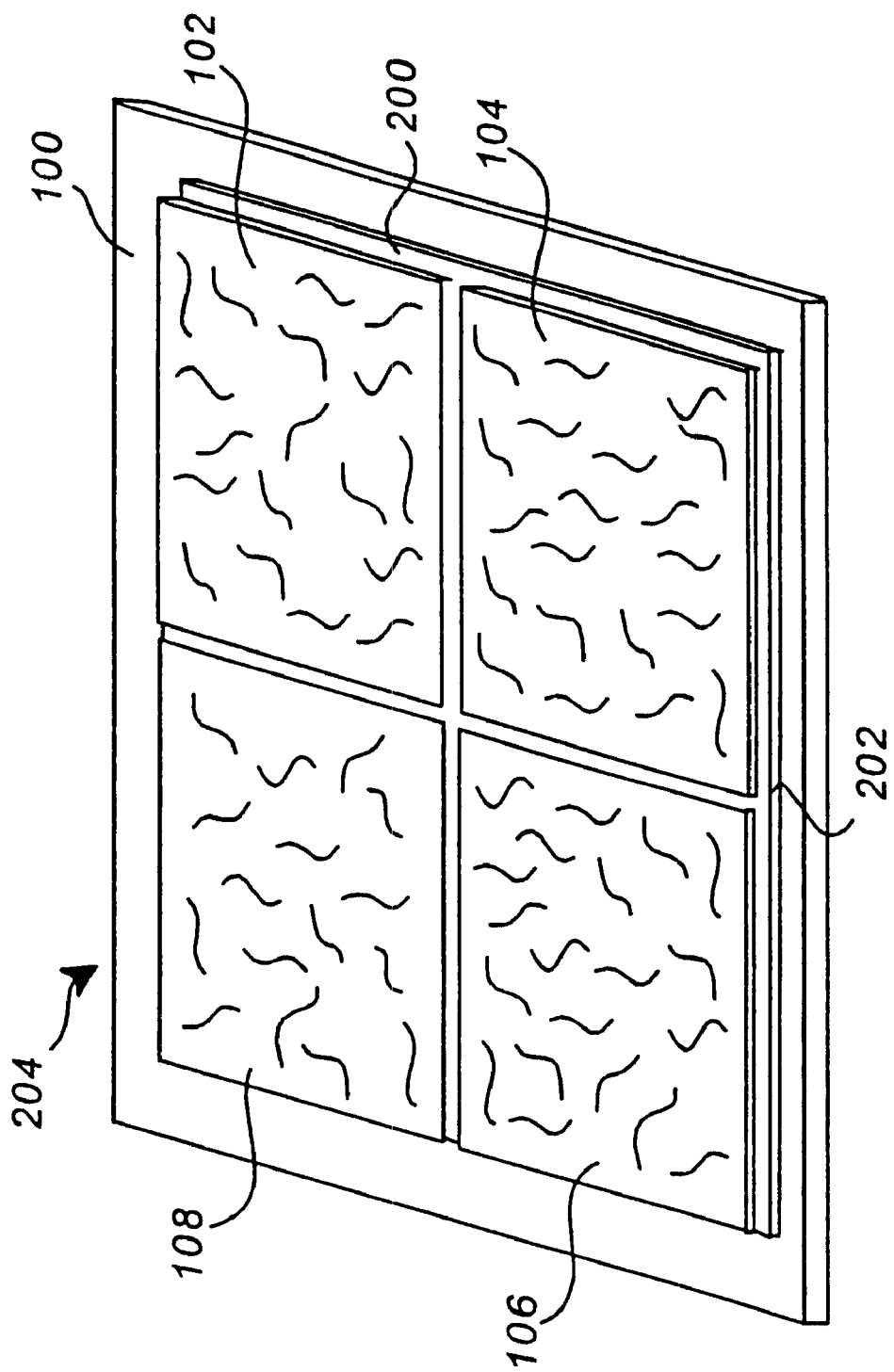
Figure 3:
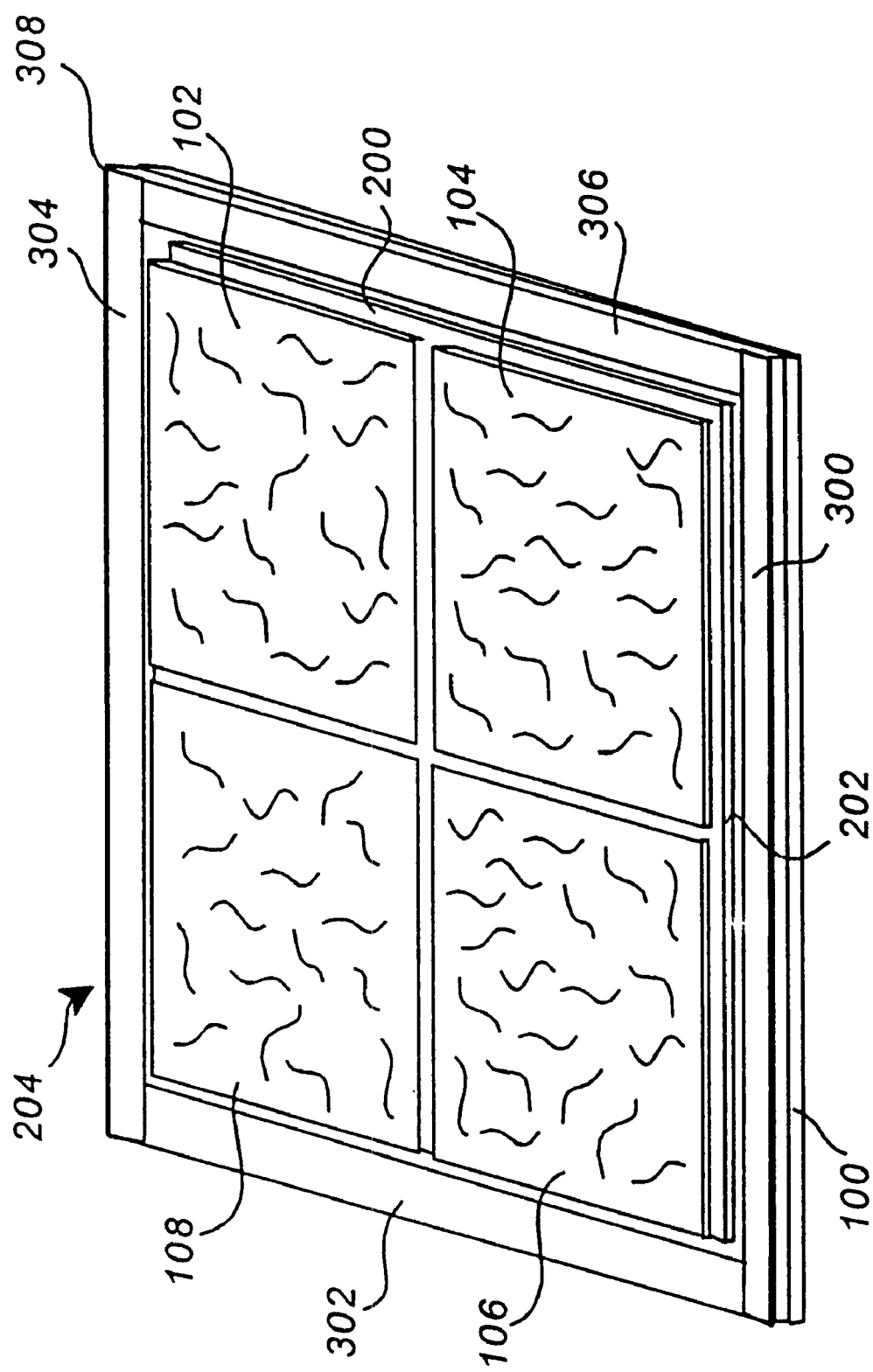

In FIG. 2, grout strips 200 and 202 have been added along two contiguous sides of flagstones 102, 104, 106 and 108. These facilitate the production of replicates that will lock together when assembled in quantity, In FIG. 3, the flagstone assemblage 204 has been walled in with wood strips 300, 302, 304 and 306. These contain the liquid silicone used to make a mold of the flagstone assemblage 204.

Figure 4:
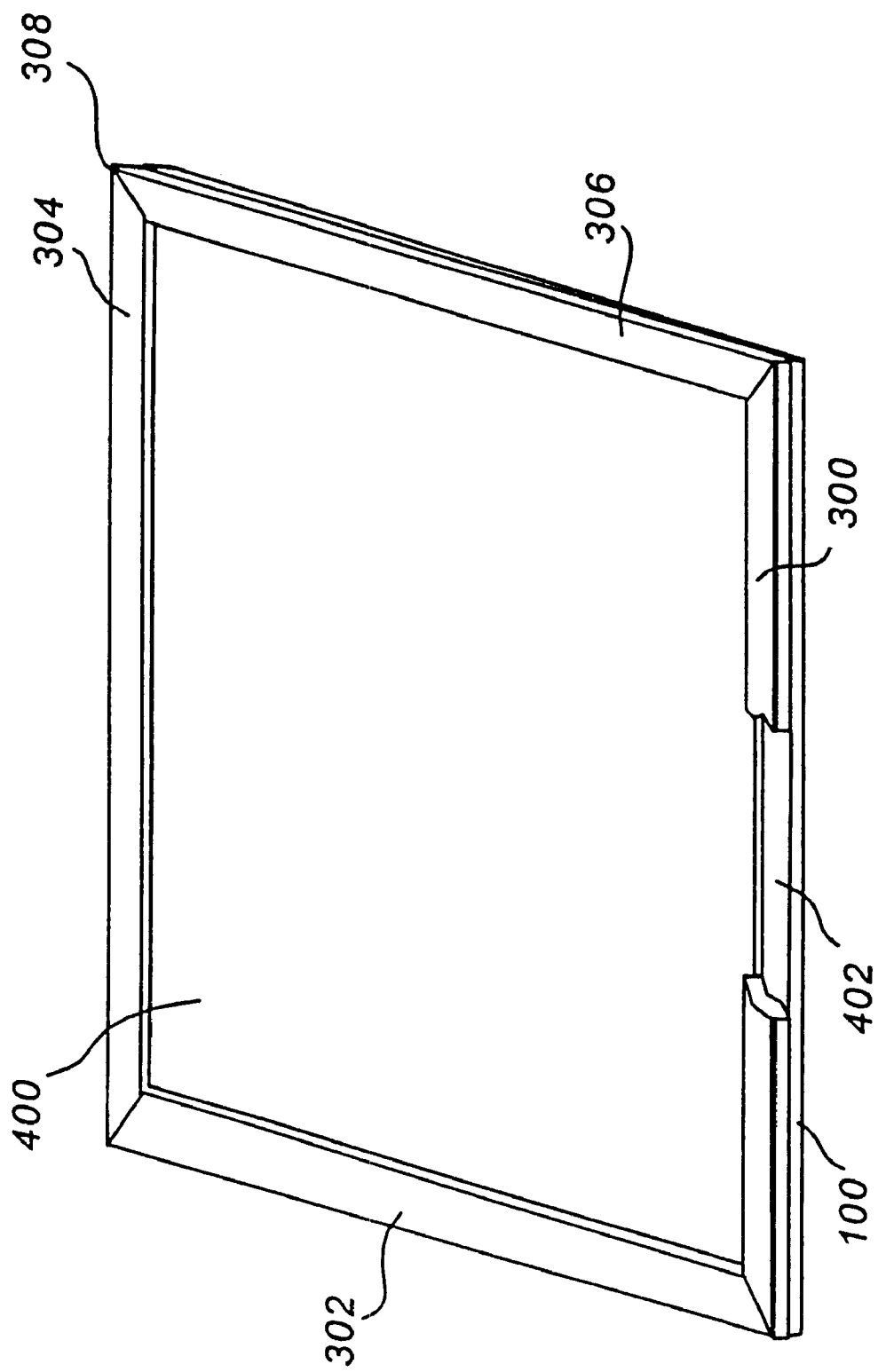

In FIG. 4, uncured silicone 400 has been poured into the receptacle made up of flagstone assemblage 204 and a frame made up of wood strips 300, 302, 304 and 308. In this view, wood strip 300 has been cut away at area 402 to illustrate the structure of frame 308.

Figure 5:
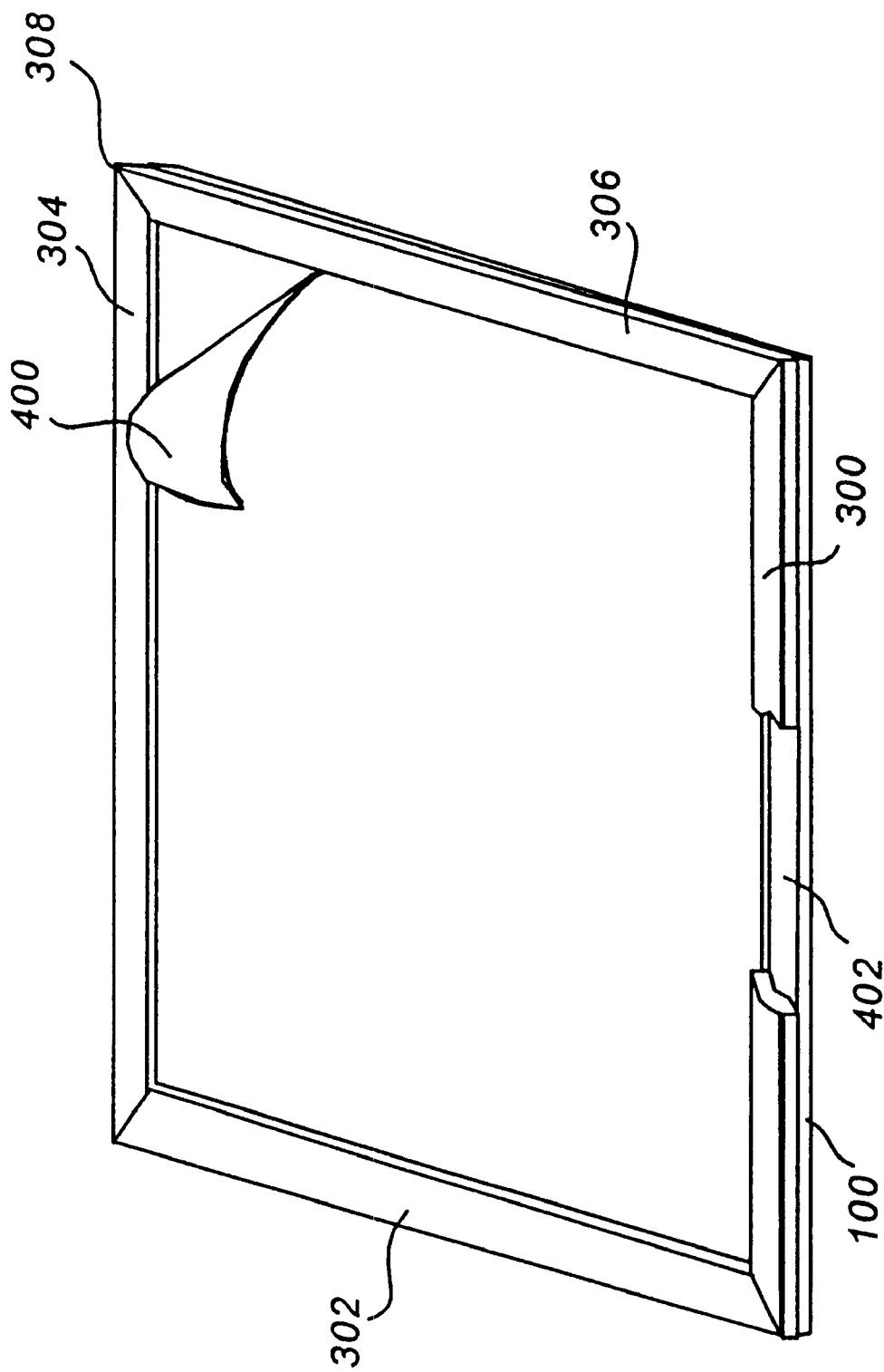
Figure 6:
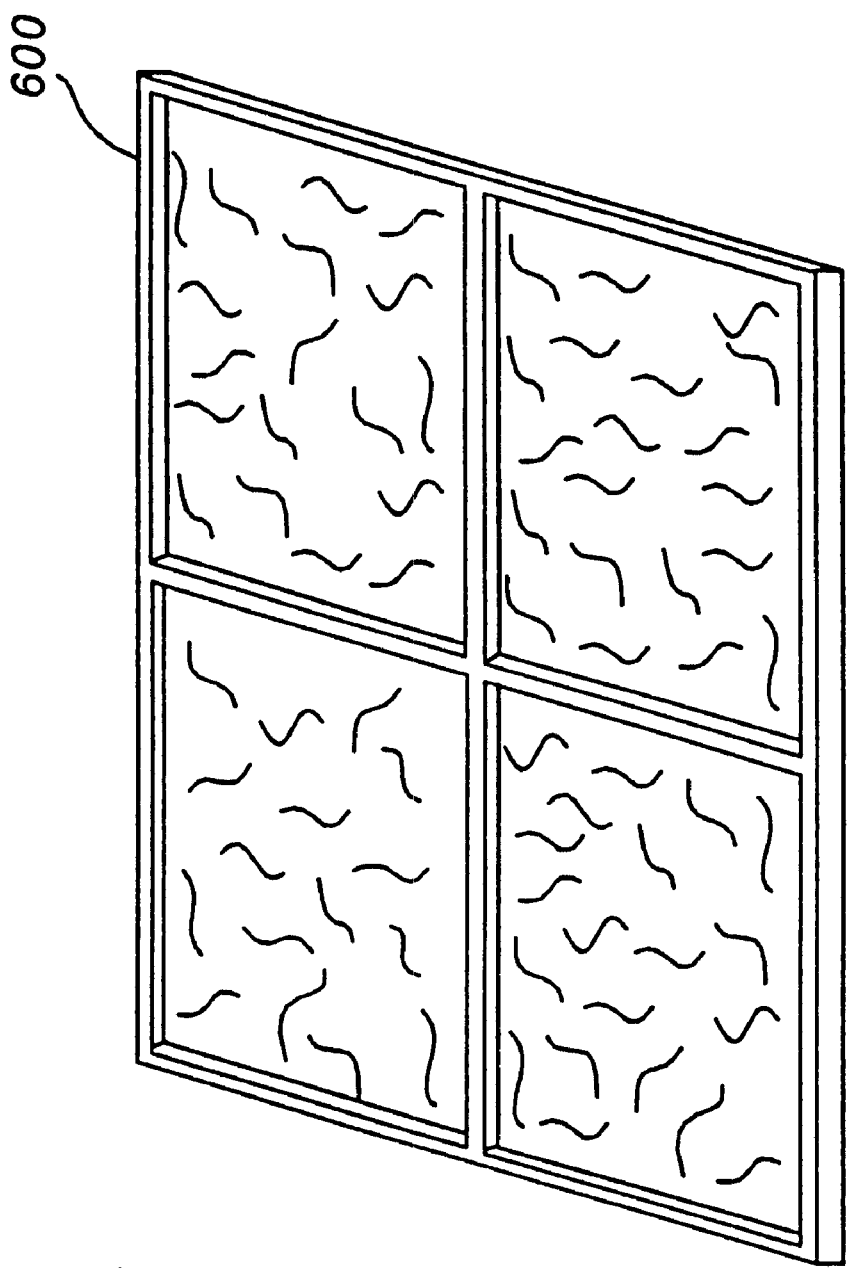

In FIG. 5, the uncured silicone 400 has cured into a flexible mold and is being lifted from frame 308 and flagstone assemblage 204. FIG. 6 depicts the finished flexible mold 600 in a position to receive uncured polyurethane plastic.

Figure 7:
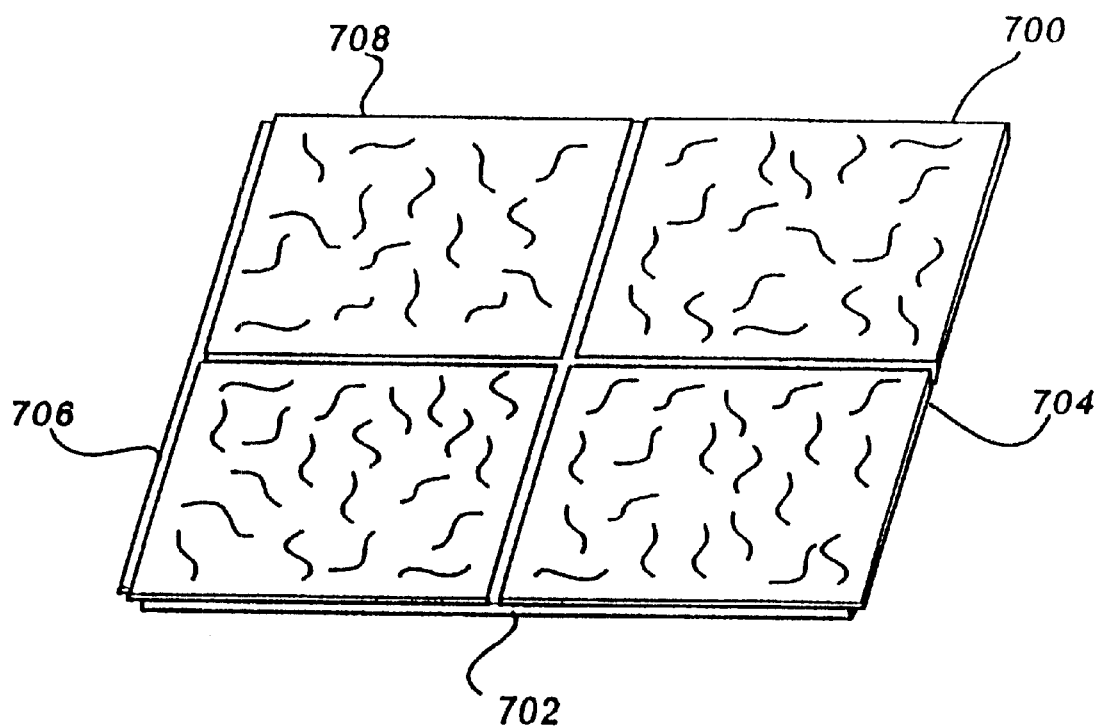
Figure 8:
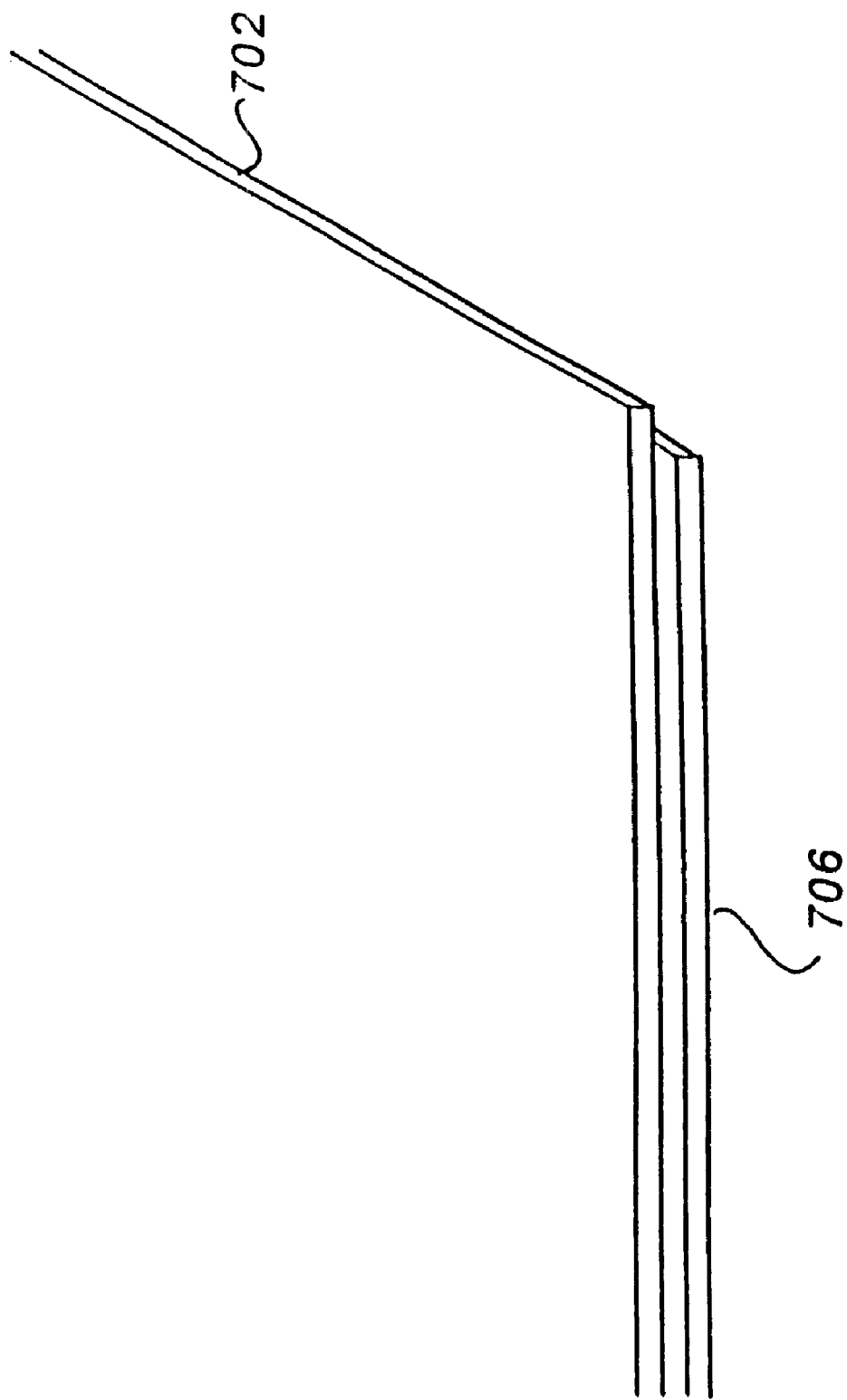
Figure 9:
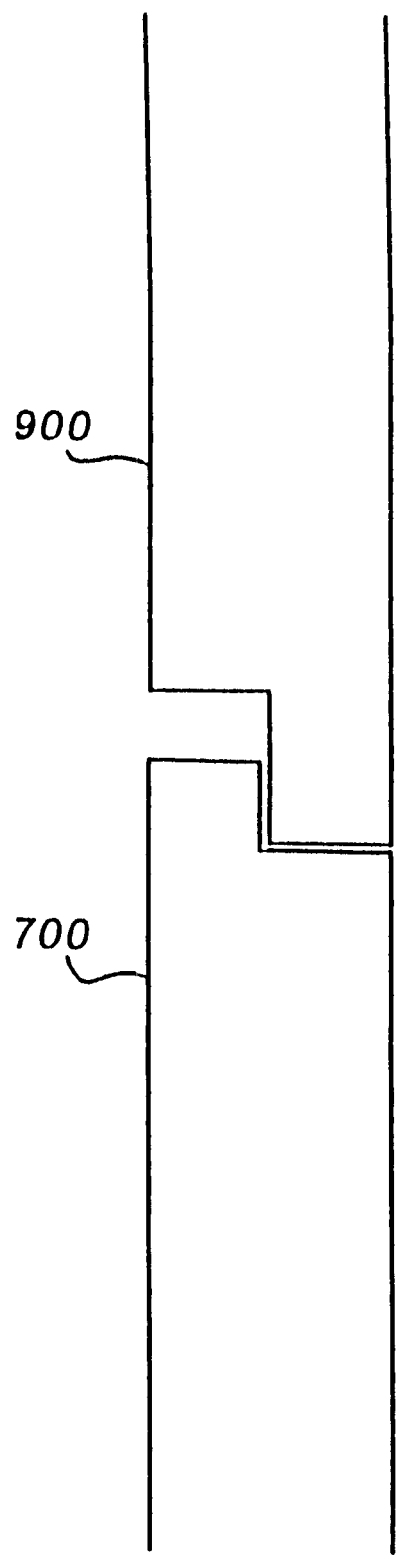

FIG. 7 depicts a polyurethane plastic panel 700 made from mold 600. Panel 700 replicates the surface of flagstone assemblage 308. Extensions 706 and 708 (not visible) are a reproduction of grout strips 200 and 202 in flagstone assemblage 204. In addition, sides 702 and 704 of panel 700 have been undercut. Panel 700 as modified with undercuts is also referred to herein as a master (or equivalently master reproduction or master cast reproduction). This can be accomplished by any known method for removing material from a plastic panel, including milling, sawing, knife cutting and laser cutting. A detail of the undercut is shown in FIG. 8, while FIG. 9 depicts a detail of how a polyurethane plastic panel (i.e., one reproduced from master 700) and another polyurethane plastic panel 900 dovetail when placed against one another.

Figure 10:
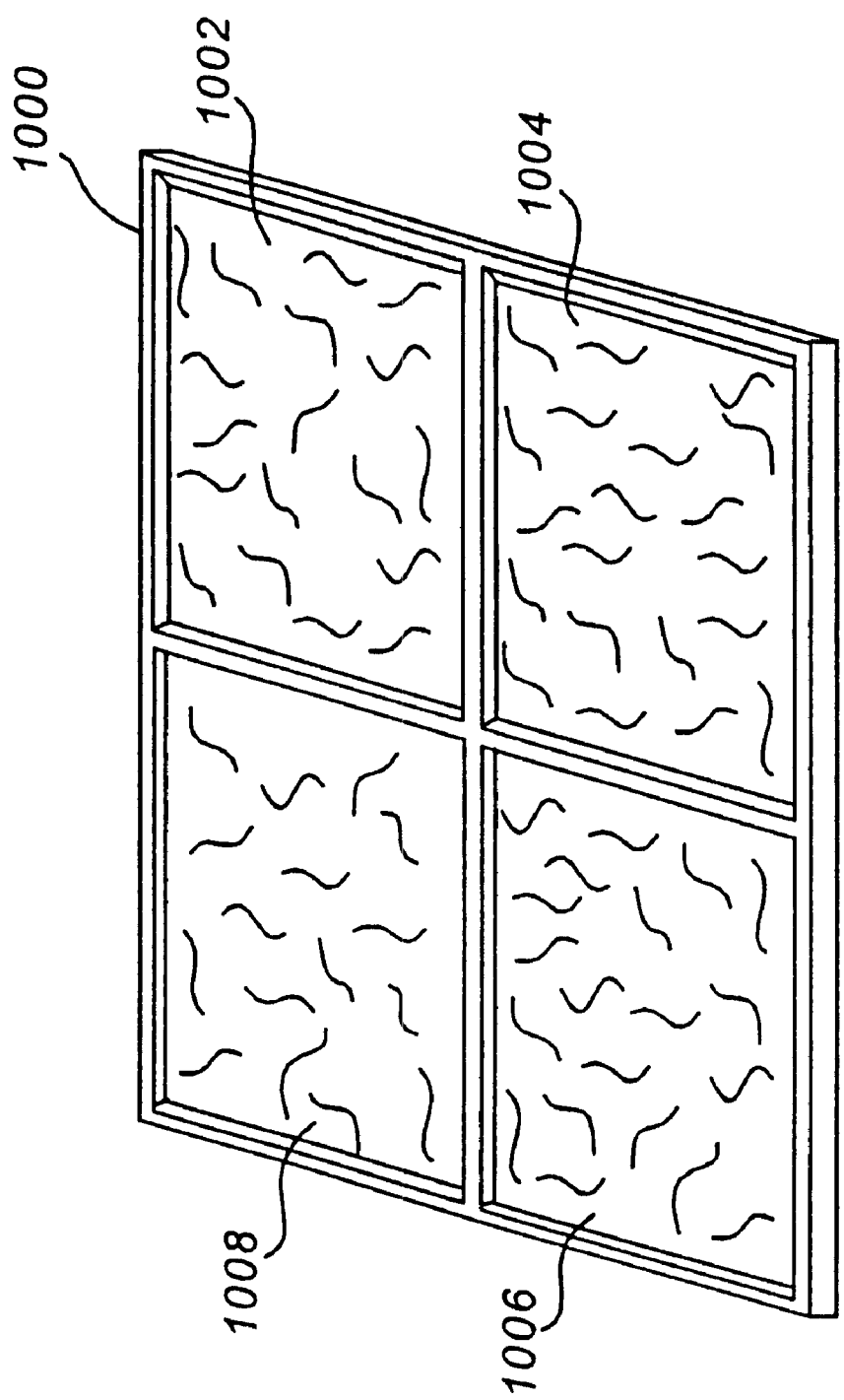

FIG. 10 depicts a flexible mold 1000 made from polyurethane plastic panel 700. Mold 1000 has four cavities 1002 through 1008 corresponding to flagstones 102, 104, 106 and 108. Mold 1000 was made using essentially the same procedures as those followed to make mold 600, except that grout strips 200 and 202 were not added or attached to polyurethane plastic panel 700.

Figure 11:
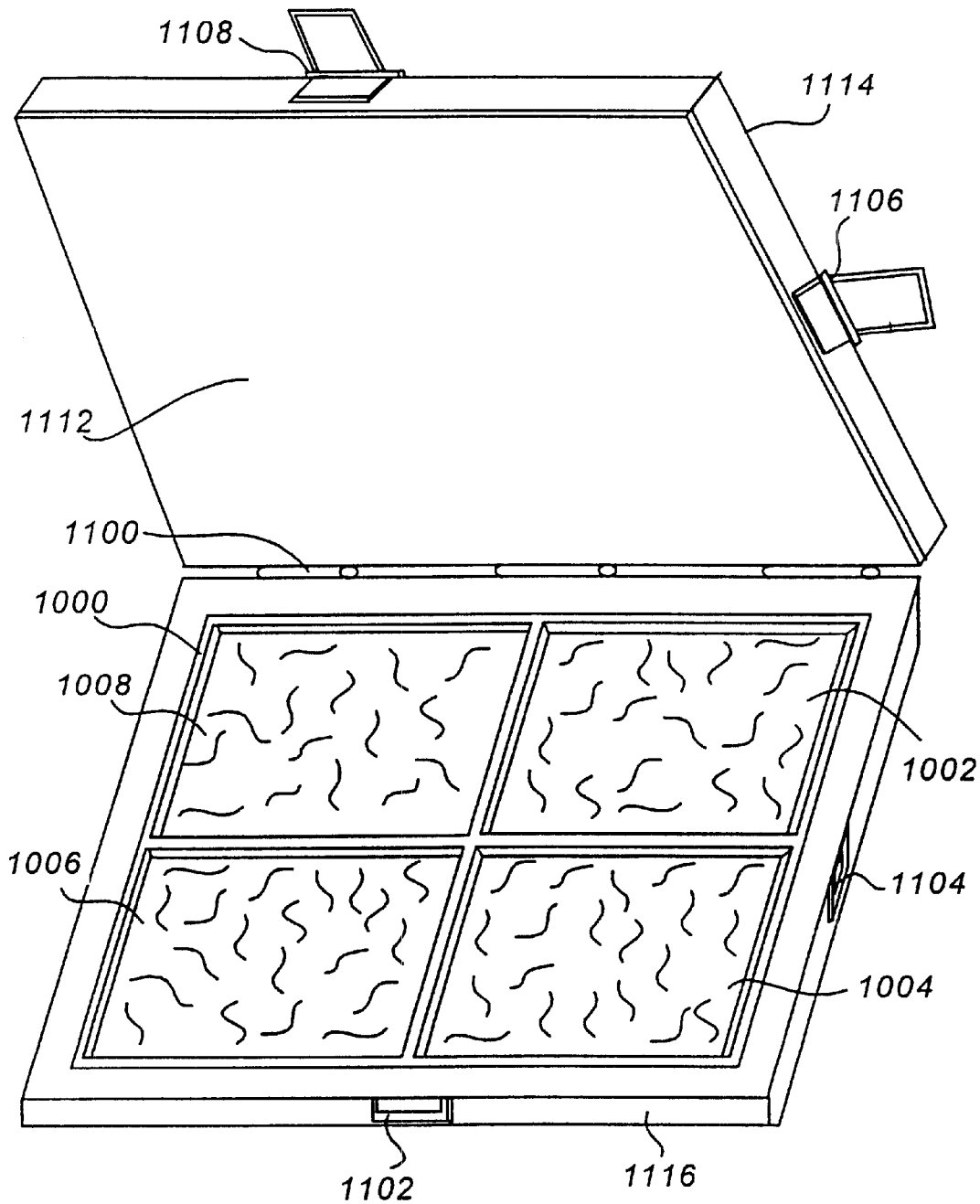

In FIG. 11, flexible mold 1000 has been placed in steel support frame 1112, which in turn is made up of steel subframes 1114 and 1116. These subframes are rotatably connected by hinge 1110. Upper subframe 1114 is fitted with a sheet of inert plastic 1112.

In practice, a production polyurethane plastic reproduction is made by filling lower subframe 1116 with uncured polyurethane plastic and rotating subframe 1114 to cover subframe 1116. Latches 1106 and 1108 are then engaged with brackets 1102 and 1104 and closed to effect a tight engagement between subframes 1114 and 1116. Inert plastic sheet 1112 prevents the uncured polyurethane plastic from sticking to subframe 1114. Once the uncured polyurethane plastic has cured, latches 1106 and 1108 are disengaged from brackets 1102 and 1104, subframe 1114 is rotated away from subframe 1116. and the cured polyurethane reproduction is removed from subframe 1116.

A polyurethane plastic reproduction made as described above can be colored on the side that replicates some or all of the cavities 1002 through 1008 of mold 1000. In one such method of coloring, one or more powdered cement dyes or other powdered coloring agents is placed in a predetermined or random pattern into at least one of cavities 1002 through 1008 of mold 1000. A fine mist of water is then sprayed over the coloring agent or agents until it dissolves or is wetted. The cavity or cavities of mold 1000 so treated are then dried. When uncured polyurethane plastic is introduced into mold 1000, the coloring agent or agents is picked up by the uncured polyurethane plastic, resulting in a polyurethane reproduction that is partially or wholly colored on the surface that replicates the contours of mold 1000.

In another method of coloring a polyurethane reproduction, one or more paints can be introduced in a predetermined or random pattern into at least one of cavities 1002 through 1008 of mold 1000. The cavity or cavities of mold 1000 so treated are then dried. When uncured polyurethane plastic is introduced into mold 1000, the dried paint or paints is picked up by the uncured polyurethane plastic, resulting in a polyurethane reproduction that is partially or wholly colored on the surface that replicates the contours of mold 1000.

In yet another method of coloring a polyurethane reproduction, one or more powdered cement dyes or other powdered coloring agents is mixed with the uncured polyurethane plastic before it is introduced into mold 1000. After the uncured polyurethane plastic is introduced into the mold and is cured, the resulting reproduction is uniformly colored both internally and externally.

FIGS. 12 through 24 depict another preferred embodiment of the invention of this application. The process described is for making replicate three-dimensional replicates. These replicates reproduce the surfaces of natural stone in a form that would be difficult or impossible to make in natural stone.

Figure 12:
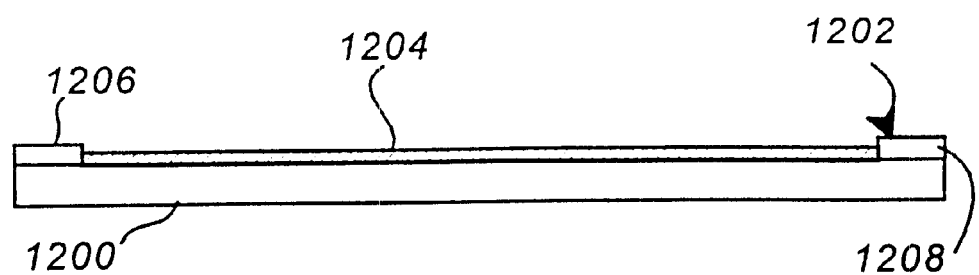
FIGS. 12 through 25 below relate to two other embodiments of the invention of this application.

FIG. 12 depicts the making of a silicone mold. Stone 1200 bears the surface for reproduction. Stone 1200 is fitted with a dam 1208 on its upper surface. The parts of dam 1208 visible in the side view of FIG. 12 are wood strips 1202 and 1206. Dam 1208 serves to contain uncured silicone rubber 1204 poured onto stone 1200.

Figure 13:

In FIG. 13, the uncured silicone 1204 has cured. Dam 1208 has been opened by removing wood strip 1202. The cured silicone rubber 1300 has become a flexible mold of stone 1200 and is being removed from stone 1200.

Figure 14:
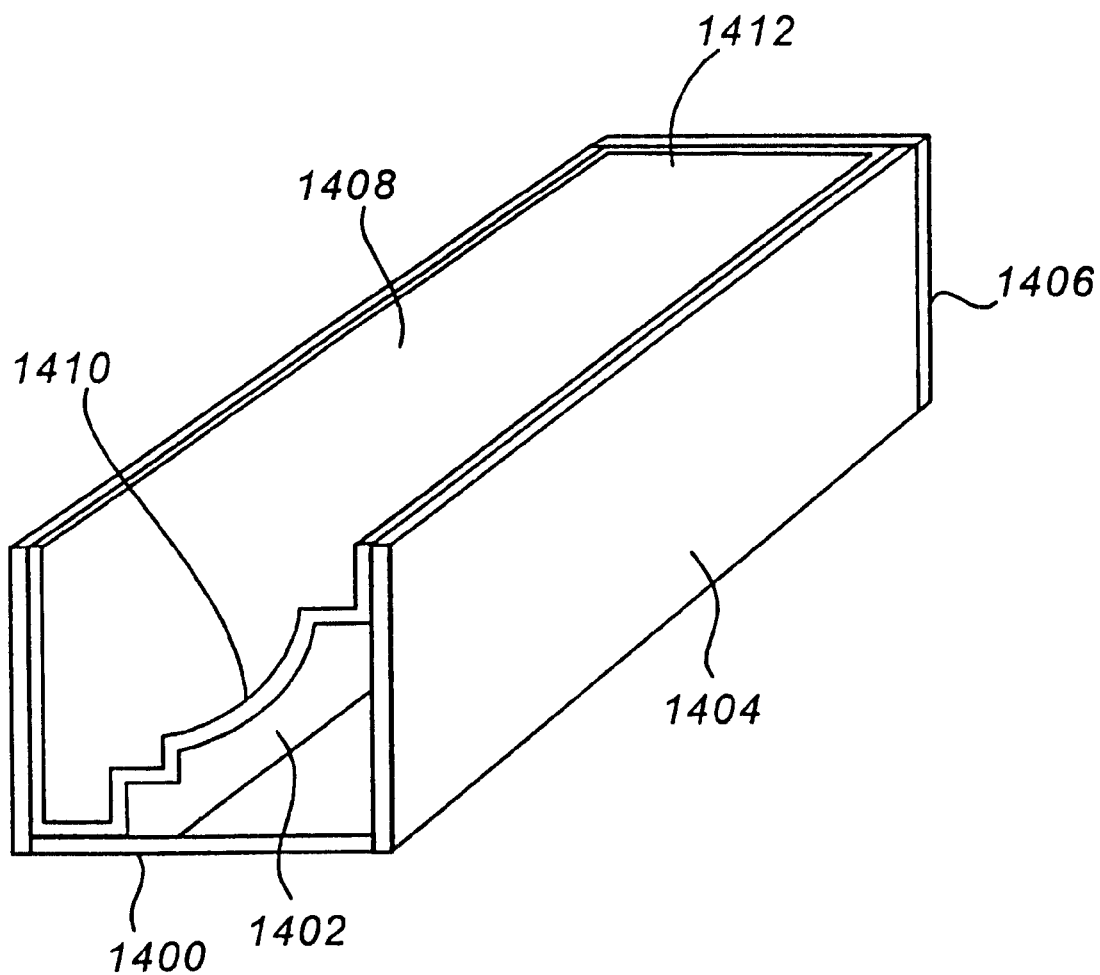
Figure 15:
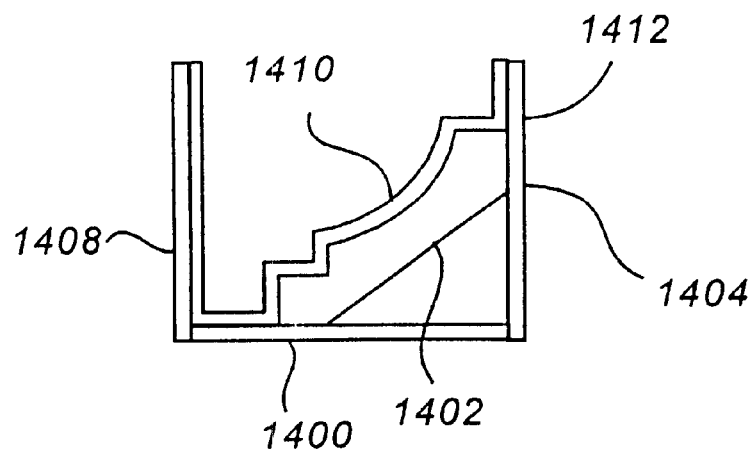

FIG. 14 depicts a rigid support structure 1412 comprising a bottom board 1400, side boards 1404 and 1408, end board 1406, and contour board 1402. The contour board 1402 determines the decorative shape of the final product. The rigid support structure 1412 is lined with a flexible mold 1410, which represents the flexible mold 1300 trimmed to fit inside support structure 1412. The flat side of rubber mold 1410 faces the inner surfaces of rigid support structure 1412, while the contoured side of rubber mold 1410 faces the interior of rigid support structure 1412. FIG. 15 is a side view of the rigid support structure 1412 of FIG. 13.

Figure 16:
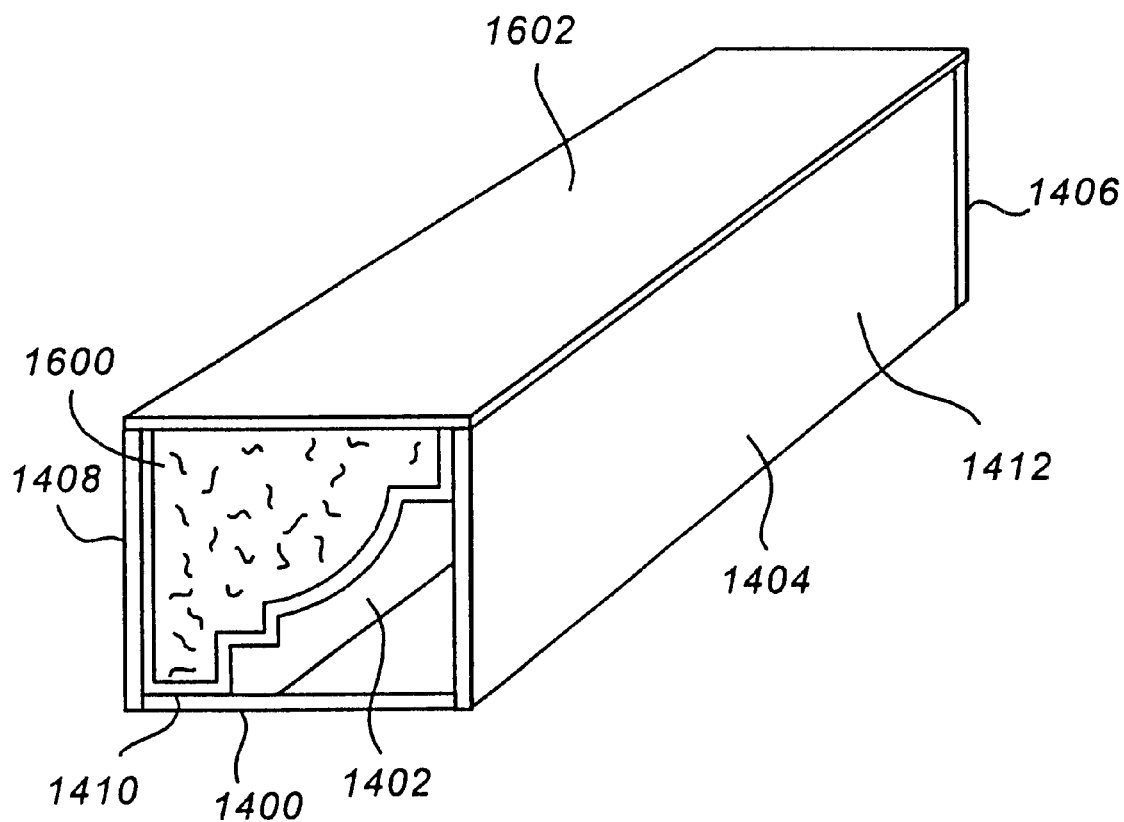
Figure 17:
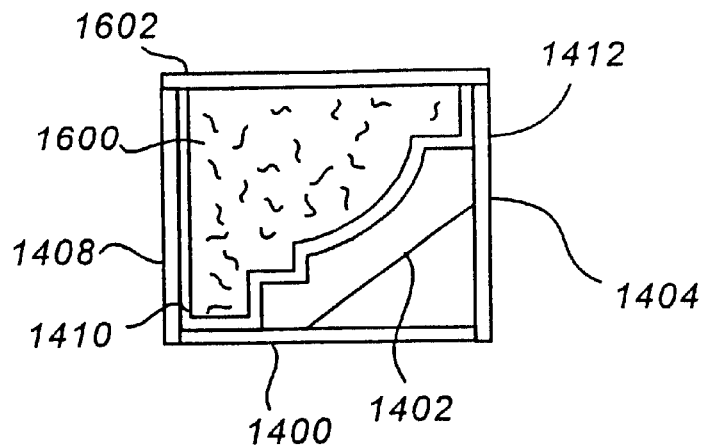

In FIG. 16, the rigid support structure 1412 has been filled with uncured polyurethane plastic 1600 and the rigid support structure 1412 closed with board 1602. A cross section from the end of the rigid support structure 1412 of FIG. 16 is shown in FIG. 17.

Figure 18:
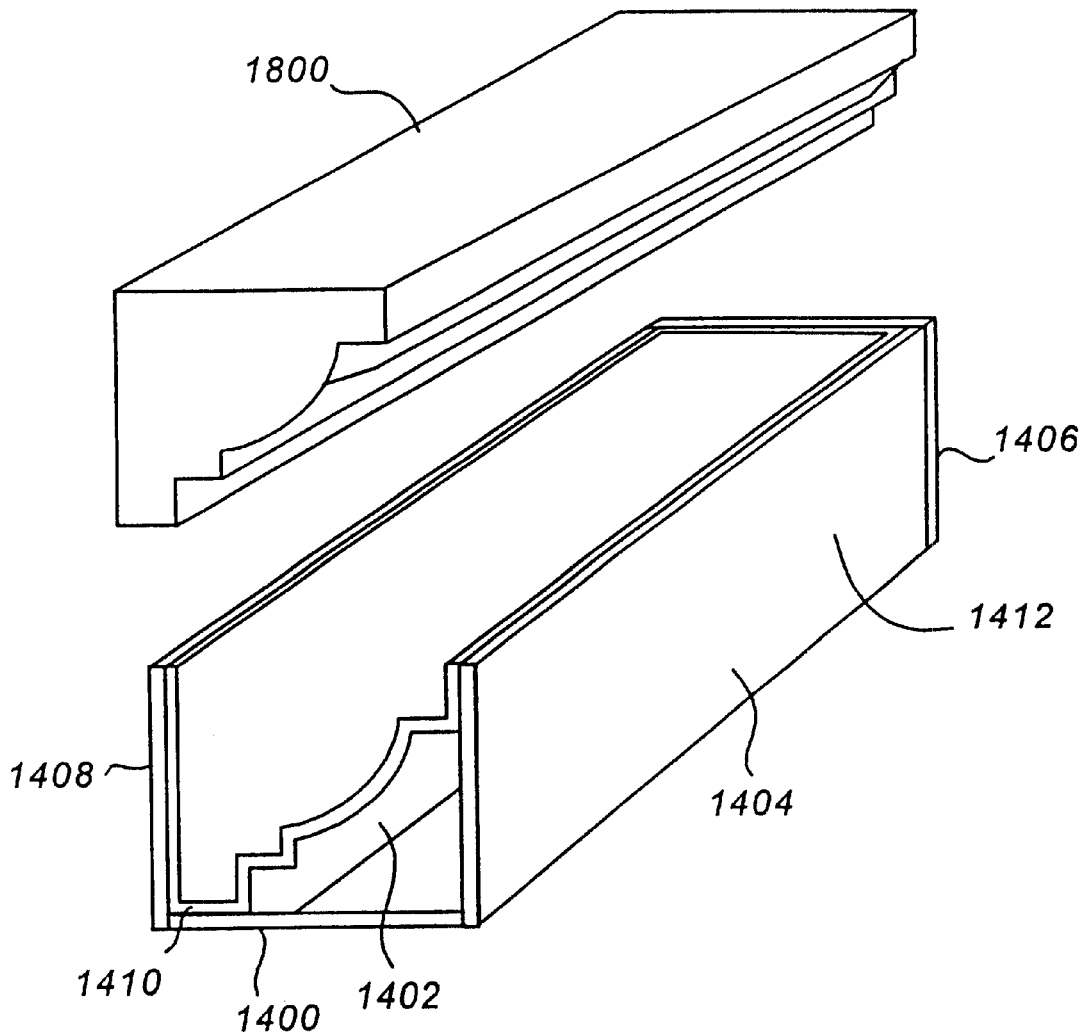
Figure 19:
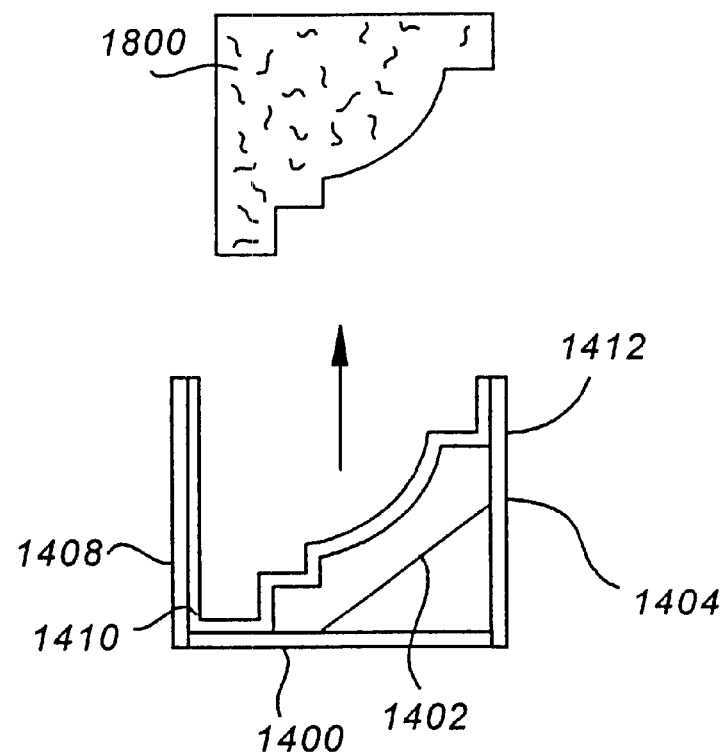

In FIG. 18, board 1602 has been removed from rigid support structure 1412 and cured polyurethane reproduction 1800 removed from rigid support structure 1412. The surface of reproduction 1800 where it contacts mold 1410 replicates the part of the surface of stone 1204. Reproduction 1800 is also referred to herein as a master, a master reproduction, or a master cast reproduction. A cross section from the end of rigid support structure 1412 of FIG. 18 is shown in FIG. 19.

Figure 20:
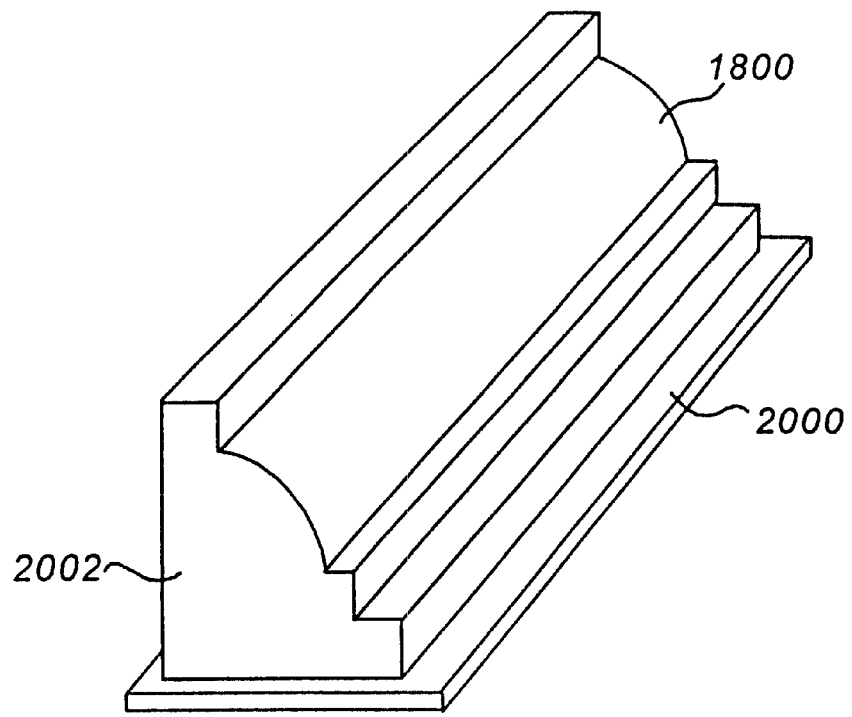
Figure 21:
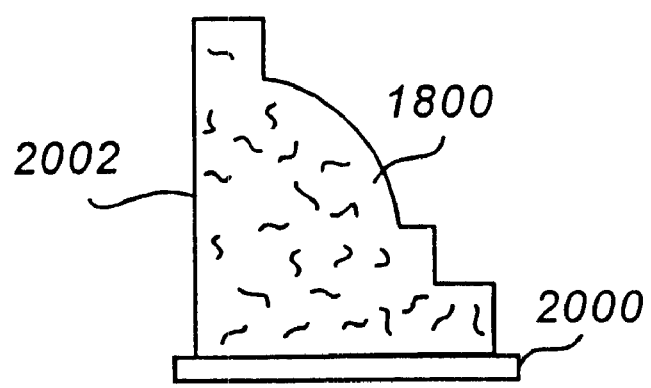

FIG. 20 depicts the cured polyurethane reproduction 1800 after it has been fully removed from rigid support structure 1412 and placed on top of a board 2000 to form assembly 2002. A cross section from the end of assembly 2002 is shown in FIG. 21.

Figure 22:
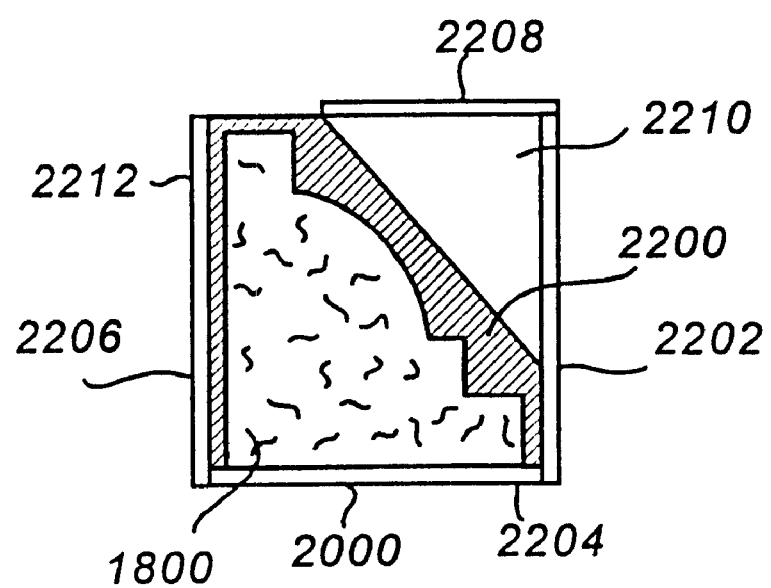

In FIG. 22, assembly 2002 has been combined with a second rigid support structure 2212. Structure 2212 comprises side boards 2202 and 2206, top board 2208 and spacer board 2210. Structure 2212 is sized and configured internally so that there is a relatively uniform gap between polyurethane reproduction 1800 and the inner surfaces of second rigid support structure 2212. When uncured silicone is poured into the open top of second rigid support structure 2212 and allowed to cure, a silicone mold 2200 of polyurethane reproduction 1800 results.

Figure 23:
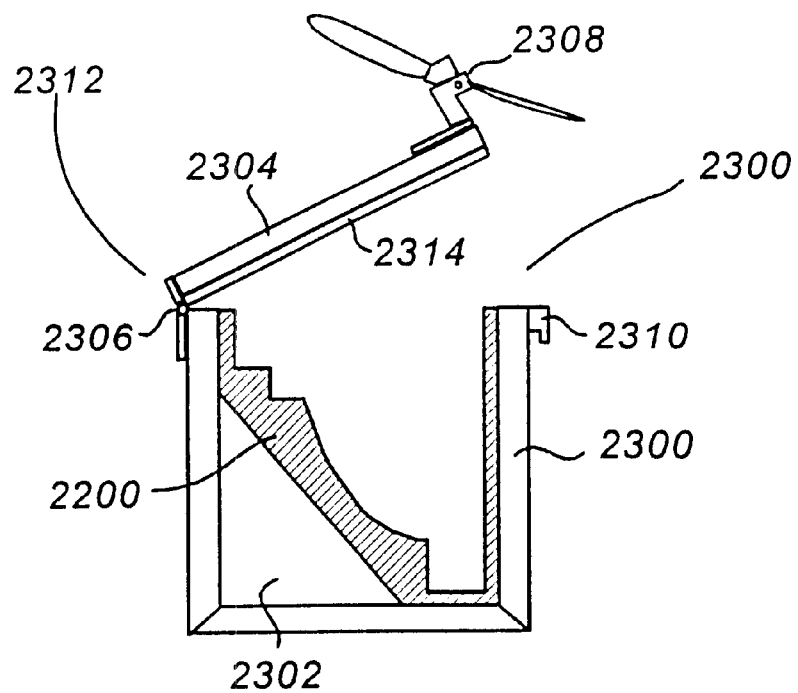

FIG. 23 depicts a third rigid support structure 2300. While the first rigid support structure 1412 and second rigid support structure 2212 were made of wood, rigid support structure 2300 is made of structural steel. Rigid support structure 2300 is sized so that it fits silicone mold 2200 as closely as possible.

As shown, flexible mold 2200 has been placed in steel support structure 2312, which in turn is made up of steel subframes 2300 and 2304. These subframes are rotatably connected by hinge 2306. Upper subframe 2304 is fitted with a sheet of inert plastic 2314.

Figure 24:
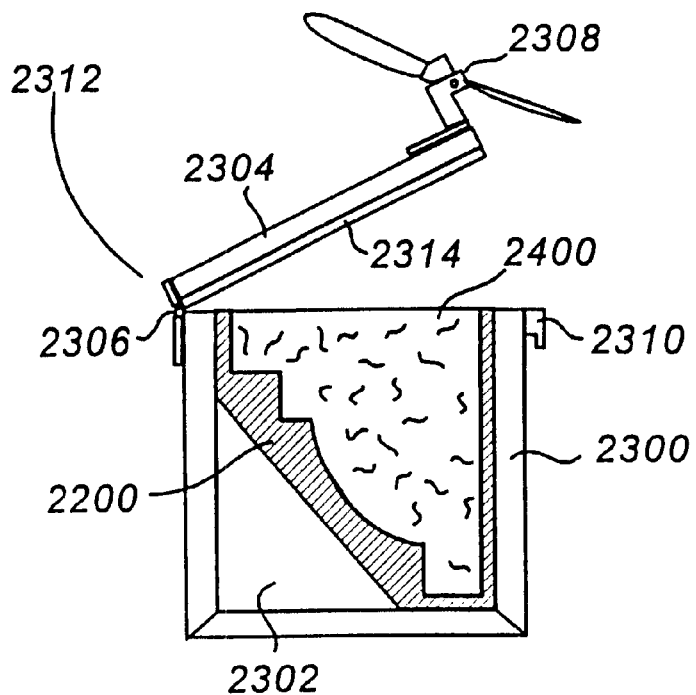

In practice, a polyurethane plastic reproduction is made by filling lower subframe 2302 with uncured polyurethane plastic and rotating subframe 2304 to cover subframe 2302. Latch 2308 is then engaged with bracket 2310 and closed to effect a tight engagement between subframes 2304 and 2302. Inert plastic sheet 2314 prevents the uncured polyurethane plastic from sticking to subframe 2304. Once the uncured polyurethane plastic has cured, latch 2308 is disengaged from bracket 2310 and subframe 2304 is rotated away from subframe 2302, as shown in FIG. 24. The cured polyurethane reproduction 2400 is then removed from subframe 2304. Polyurethane reproductions made as described above can be colored by various methods, including those described above.

Figure 25:
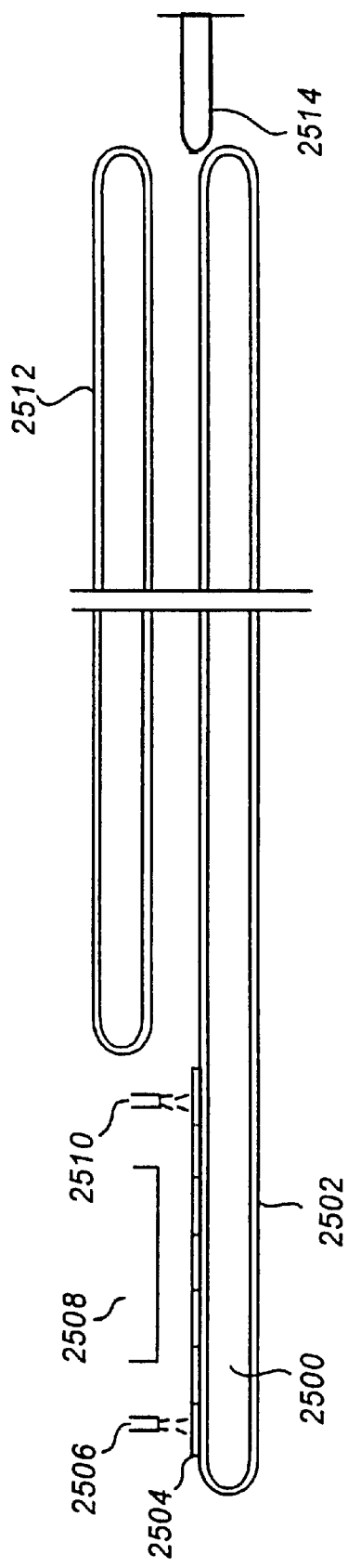

FIG. 25 depicts a machine 2500 for the continuous production of polyurethane reproductions. Lower conveyor 2502 is loaded continuously with molds 2504, which are made from one or more natural articles. Once a mold 2504 is placed on lower conveyor 2502, coloring one or more coloring dispensers 2506 introduce one or more coloring agents and paints, as well as water where required, into the interior of the mold 2504 so as to color the reproductions produced from molds 2504 by various methods, including the methods described above. Lower conveyor 2502 then conveys molds 2504 to one or more heaters 2508, which dries all coloring agents, paints and water in molds 2504, and also heats mold 2504.

Lower conveyor 2502 then conveys molds 2504 to plastic dispenser 2510, which fills molds 2504 with a castable polyurethane. Next, lower conveyor 2502 conveys molds 2504 under upper conveyor 2512, which prevents the castable urethane from foaming beyond the confines of molds 2504. Finally, lower conveyor 2502 conveys molds 2504 beyond upper conveyor 2512 and onto receiving platform 2514, where the cured reproductions are removed from molds 2504.

Many types of materials can be used in practicing the invention of this application. The silicone currently preferred by the inventor is a mold casting silicone rubber made and sold by Synair Corporation of Tennessee as Silmold SI 25. This is a 25 durometer material. The inventor has used a comparable material with a 40 durometer rating.

The polyurethane plastic preferred by the inventor is a rigid polyurethane foam system made and sold by the Urethane Technologies Corporation of New York. This system produces cured polyurethane plastic having a density that ranges from about 7 pounds per cubic feet to about 25 pounds per cubic feet. This system is provided in two parts: part A and part B. To the best of the inventor's knowledge, Part A is a resin component containing polyols, blowing agents and catalytic agents. Part B is a polyisocyanate component containing polymethylene, polyphenyl and isocyanate.

The embodiments discussed above are merely exemplary of the invention of this application. They are not intended to limit the scope of the claims of this application in any respect. Many substances and techniques different from those discussed above can be used in practicing the invention of the application, and a wide range of techniques can be used for that purpose. Only preferred embodiments and minor variants thereof have been shown and described above, and all changes and modifications that come within the spirit of the invention are intended to be protected.

What is claimed is:

1. A method for making a cast reproduction that replicates on at least part of its surface the surface of a modified natural article, said method comprising the steps of:

modifying at least part of the surface of said natural article to a predetermined configuration to produce a modified natural article, making a first flexible mold that replicates at least part of the surface of said modified natural article, filling said first flexible mold with a first castable material to produce a first cast reproduction, modifying said first cast reproduction to form a master cast reproduction, making a second flexible mold that replicates at least part of the surface of said master cast reproduction, placing said second flexible mold in a closable support structure, and filling said second flexible mold with a second castable material and closing said support structure to produce a second cast reproduction of at least part of the surface of said second flexible mold.

2. The method of claim 1 wherein the step of filling said second flexible mold includes the step of using said second flexible mold to produce a plurality of cast reproductions of at least part of the surface of said second flexible mold.

3. The method of claim 1 wherein said closable support structure is made from a rigid material and partially lined with an inert material to prevent adhesion of said second castable material to said closable support structure.

4. The method of claim 1 wherein the step of filling the second flexible mold further includes the step of placing at least one powdered coloring agent into the second flexible mold.

5. The method of claim 1 wherein the step of filling the second flexible mold further includes the step of placing at least one paint into the second flexible mold.

6. The method of claim 1 wherein the step of filling the second flexible mold further includes the step of mixing at least one powdered coloring agent into the second castable material.

7. The method of claim 1 wherein the step of filling the second flexible mold further includes the step of making additional flexible molds by using the second cast reproduction as a master reproduction.

8. The method of claim 1 wherein at least one of the first flexible mold and the second flexible mold are made from silicone.

9. The method of claim 1 wherein at least one of the first castable material and second castable material is a polyurethane.

10. The method of claim 1 wherein said natural article is stone.

11. A method for making a cast reproduction that replicates on at least part of its surface the surface of a modified natural article, said method comprising the steps of:

modifying at least part of the surface of said natural article to a predetermined configuration to produce a modified natural article, making a first flexible mold that replicates at least part of the surface of said modified natural article, filling said first flexible mold with a first castable material to produce a first cast reproduction, modifying said first cast reproduction to form a master cast reproduction, making a second flexible mold that replicates at least part of the surface of said master cast reproduction, filling said second flexible mold with a second castable material to produce a second cast reproduction of at least part of the surface of said second flexible mold, and making additional flexible molds by using the second cast reproduction as a master reproduction.

12. A method for making a cast reproduction that replicates at least part of the surface of a natural article, said method comprising the steps of:

making a first flexible mold that replicates at least part of the surface of said natural article, filling said first flexible mold with a first castable material to produce a first cast reproduction, modifying said first cast reproduction to form a master cast reproduction, making a second flexible mold that replicates at least part of the surface of said master cast reproduction, placing said second flexible mold in a closable support structure, filling said second flexible mold with a second castable material and closing said support structure to produce a second cast reproduction of at least part of the surface of said second flexible mold.

13. The method claim 12 wherein said closable support structure is made from a rigid material and partially lined with an inert material to prevent adhesion of said second castable material to said closable support structure.

14. The method of claim 12 wherein the second castable material is an expansible polyurethane plastic.

* * * * *